(12) United States Patent
Li et al.

(10) Patent No.: US 11,581,959 B2
(45) Date of Patent: Feb. 14, 2023

(54) CHANNEL ESTIMATION AND PREDICTION WITH MEASUREMENT IMPAIRMENT

(71) Applicant: Samsung Electronics Co., Ltd., Suwon-si (KR)

(72) Inventors: Yang Li, Plano, TX (US); Junmo Sung, Richardson, TX (US); Rui Wang, San Jose, CA (US); Yeqing Hu, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 17/188,934

(22) Filed: Mar. 1, 2021

(65) Prior Publication Data

US 2021/0281334 A1      Sep. 9, 2021

Related U.S. Application Data

(60) Provisional application No. 63/144,747, filed on Feb. 2, 2021, provisional application No. 62/985,117, filed on Mar. 4, 2020.

(51) Int. Cl.
| | |
|---|---|
| *H04W 48/16* | (2009.01) |
| *H04B 17/18* | (2015.01) |
| *H04B 17/10* | (2015.01) |
| *H04B 17/12* | (2015.01) |
| *H04W 80/02* | (2009.01) |
| *H04B 17/26* | (2015.01) |
| *H04W 72/04* | (2023.01) |

(Continued)

(52) U.S. Cl.
CPC ............ *H04B 17/18* (2015.01); *H04B 17/102* (2015.01); *H04B 17/12* (2015.01); *H04B 17/26* (2015.01); *H04L 25/0226* (2013.01); *H04W 56/005* (2013.01); *H04W 72/042* (2013.01); *H04W 80/02* (2013.01)

(58) Field of Classification Search
CPC . H04W 56/005; H04W 72/042; H04W 80/02; H04L 25/0226; H04L 25/0224
See application file for complete search history.

(56) References Cited

U.S. PATENT DOCUMENTS

| | | | |
|---|---|---|---|
| 8,185,057 B2 | 5/2012 | Molnar et al. | |
| 9,853,699 B2 | 12/2017 | Jalloul et al. | |
| 10,819,448 B2 * | 10/2020 | Raghavan | H04B 17/17 |

(Continued)

FOREIGN PATENT DOCUMENTS

WO    WO-2014008073 A1 *    1/2014    ........... H04B 17/345

*Primary Examiner* — Lan-Huong Truong

(57) ABSTRACT

A base station (UE) is configured to perform a computer-implemented method for antenna fault detection and correction. The computer-implemented method includes acquiring one or more sounding reference signals (SRSs) received from at least one gNB antenna; detecting an antenna failure based on the one or more SRSs; estimating a noise power based on the antenna failure and a history of received SRSs; detecting a missing SRS based on the noise power and the history of received SRSs; and handling the missing SRS. Handling the missing SRS is based on performing at least one of: replacing an SRS measurement with a predicted SRS value for the missing SRS when the predicted SRS is available; or avoiding use of the missing SRS in a sequential SRS prediction when the predicted SRS is unavailable.

20 Claims, 12 Drawing Sheets

830

1005 — If predicted SRS available for the missing SRS, replace measurement with the predicted value 1010 — If predicted SRS unavailable for the missing SRS, mark the SRS so it is not used in the sequential SRS prediction

(51) Int. Cl.
*H04W 56/00* (2009.01)
*H04L 25/02* (2006.01)

(56) References Cited

U.S. PATENT DOCUMENTS

2019/0182834 A1 6/2019 Lei
2021/0384949 A1* 12/2021 Kumar .................. H04L 5/0023

* cited by examiner

CHANNEL ESTIMATION AND PREDICTION WITH MEASUREMENT IMPAIRMENT

CROSS-REFERENCE TO RELATED APPLICATIONS AND CLAIM OF PRIORITY

The present application claims priority to U.S. Provisional Patent Application No. 62/985,117 filed on Mar. 4, 2020, and U.S. Provisional Patent Application No. 63/144,747, filed on Feb. 2, 2021. The content of the above-identified patent documents is incorporated herein by reference.

TECHNICAL FIELD

The present disclosure relates generally to wireless communication systems and more specifically to channel estimation and prediction with measurement impairment.

BACKGROUND

Understanding and correctly estimating the channel between a user equipment (UE) and a base station (BS) (e.g., gNode B (gNB)) is important for efficient and effective wireless communication. In order to correctly estimate the downlink (DL) channel conditions, the gNB may transmit a reference signal, e.g., Channel State Information-Reference Signal (CSI-RS), to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for full power uplink (UL) multiple-input multiple-output (MIMO) operation in an advanced wireless communication system.

In one embodiment, a method is provided. The method comprises receiving, via at least one gNB antenna, one or more sounding reference signals (SRSs); detecting an antenna failure based on the one or more SRSs; estimating a noise power based on the antenna failure and a history of received SRSs; detecting a missing SRS based on the noise power and the history of received SRSs; and handling the missing SRS. Handling the missing SRS is based on performing at least one of: replacing an SRS measurement with a predicted SRS value for the missing SRS when the predicted SRS is available; or avoiding use of the missing SRS in a sequential SRS prediction when the predicted SRS is unavailable.

In yet another embodiment, a base station (BS) is provided. The BS includes one or more antennas and a transceiver operably connected to the one or more antennas, the transceiver configured to receive one or more sounding reference signals (SRSs). The BS further includes a processor operably connected to the one or more antennas. The processor is configured to detect an antenna failure based on the one or more SRSs; estimate a noise power based on the antenna failure and a history of received SRSs; detect a missing SRS based on the noise power and the history of received SRSs; and handle the missing SRS. Handling the missing SRS is based on at least one of: replacement of an SRS measurement with a predicted SRS value for the missing SRS when the predicted SRS is available; or avoidance of use of the missing SRS in a sequential SRS prediction when the predicted SRS is unavailable.

In another embodiment, a non-transitory computer readable medium is provided. The non-transitory computer readable medium includes a plurality of instructions that, when executed by at least one processor, causes the at least one processor to: receive, via at least one gNB antenna, one or more sounding reference signals (SRSs); detect an antenna failure based on the one or more SRSs; estimate a noise power based on the antenna failure and a history of received SRSs; detect a missing SRS based on the noise power and the history of received SRSs. Handling the missing SRS is based on performing at least one of: replacement of an SRS measurement with a predicted SRS value for the missing SRS when the predicted SRS is available; or avoidance of a use of the missing SRS in a sequential SRS prediction when the predicted SRS is unavailable.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
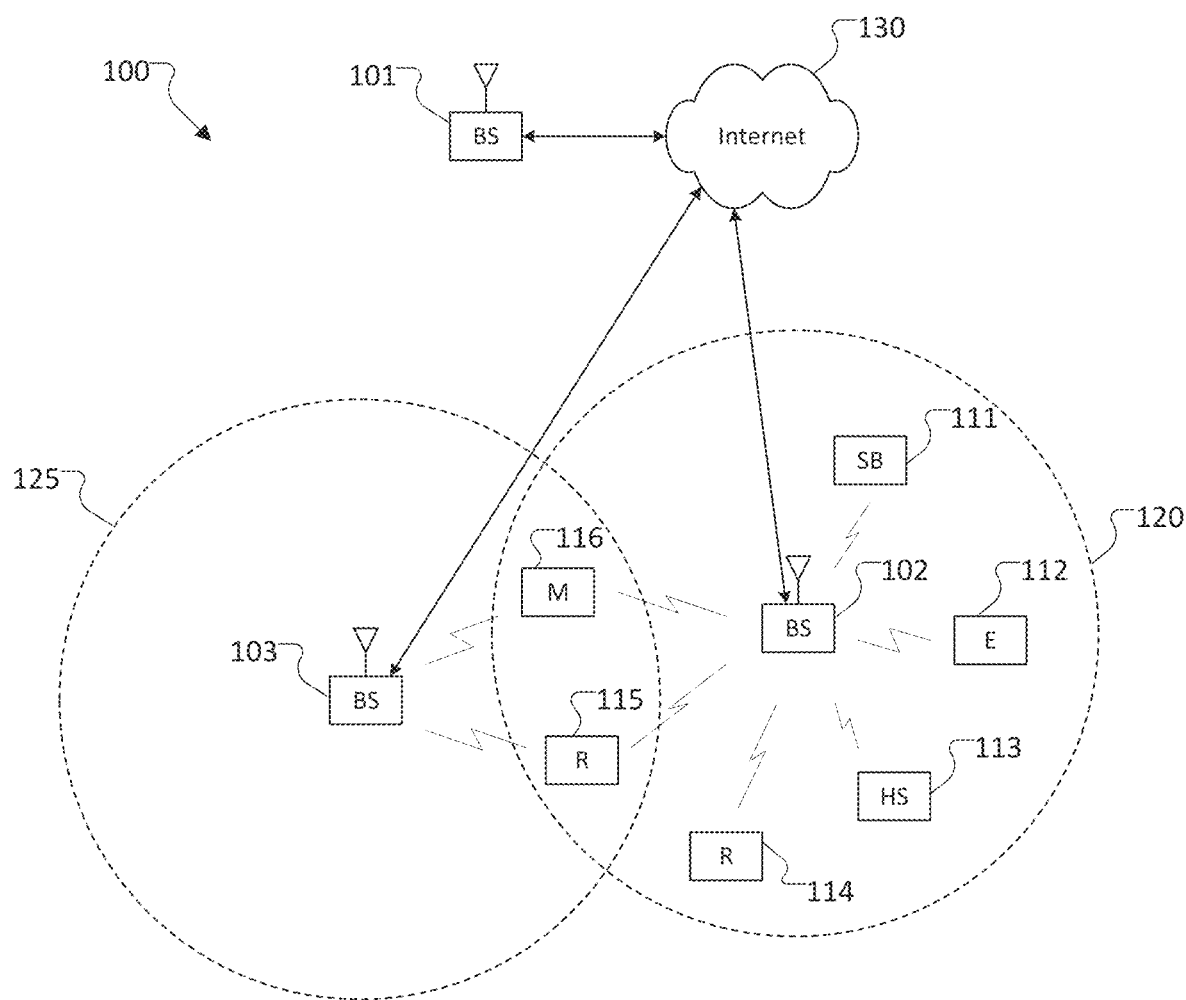
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

For the User Equipment (UE) in mobility, outdated Channel State Information (CSI) obtained via Sounding Reference Signals (SRS) degrades Multi-User MIMO (MU MIMO) performance. Algorithms relying on past SRS to predict update-to-date CSI are preferred and can improve the throughput. In actual field and deployment, measurement impairment on SRS is unavoidable and without properly handling, CSI prediction performance can be degraded.

Massive MIMO (mMIMO) is a core technology to improve spectral efficiency in the 4th generation (4G) and the 5th generation (5G) new radio (NR) cellular networks. Accurate downlink channel-state-information (CSI) at base-station (BS) is essential to maintain high spectral efficiency. Many mMIMO systems use time-division-duplex (TDD)

architecture, where CSI is obtained from uplink sounMaintaining accurate CSI in UE mobility scenarios is a well-known industry-wide challenge for both long term evolution (LTE) and NR. In literatures, CSI can be predicted via different methods, which can be broadly categorized into non-parametric methods, parametric methods, and ding reference signal (SRS). SRS is periodically transmitted from user equipment (UE) to provide CSI update.

Certain embodiments provide for machine-learning based methods. For non-parametric methods, one approach introduced an optimal two-dimensional (2D) minimum mean square error (MMSE)-based method for MIMO channel prediction, and a suboptimal two-step method based on one-dimensional (1D) MMSE. The method assumes availability of temporal and spatial channel correlation at BS. Another approach proposed a first-order Taylor expansion-based predictive channel modeling method for mMIMO. Another approach developed a simple prediction scheme based on linear extrapolation, which was shown to track the channel and improve bit error rate (BER) in both simulation and measurement data with perfect synchronization between transmitter and receiver. For parametric methods, there can be a MIMO channel tracking method based on singular value decomposition (SVD) of channel temporal and spatial components. One approach presented a MIMO channel predictor based on an extension of single input single output (SISO) estimation of signal parameters via rotational invariance technique (ESPRIT)-based technique.

Figure 2:
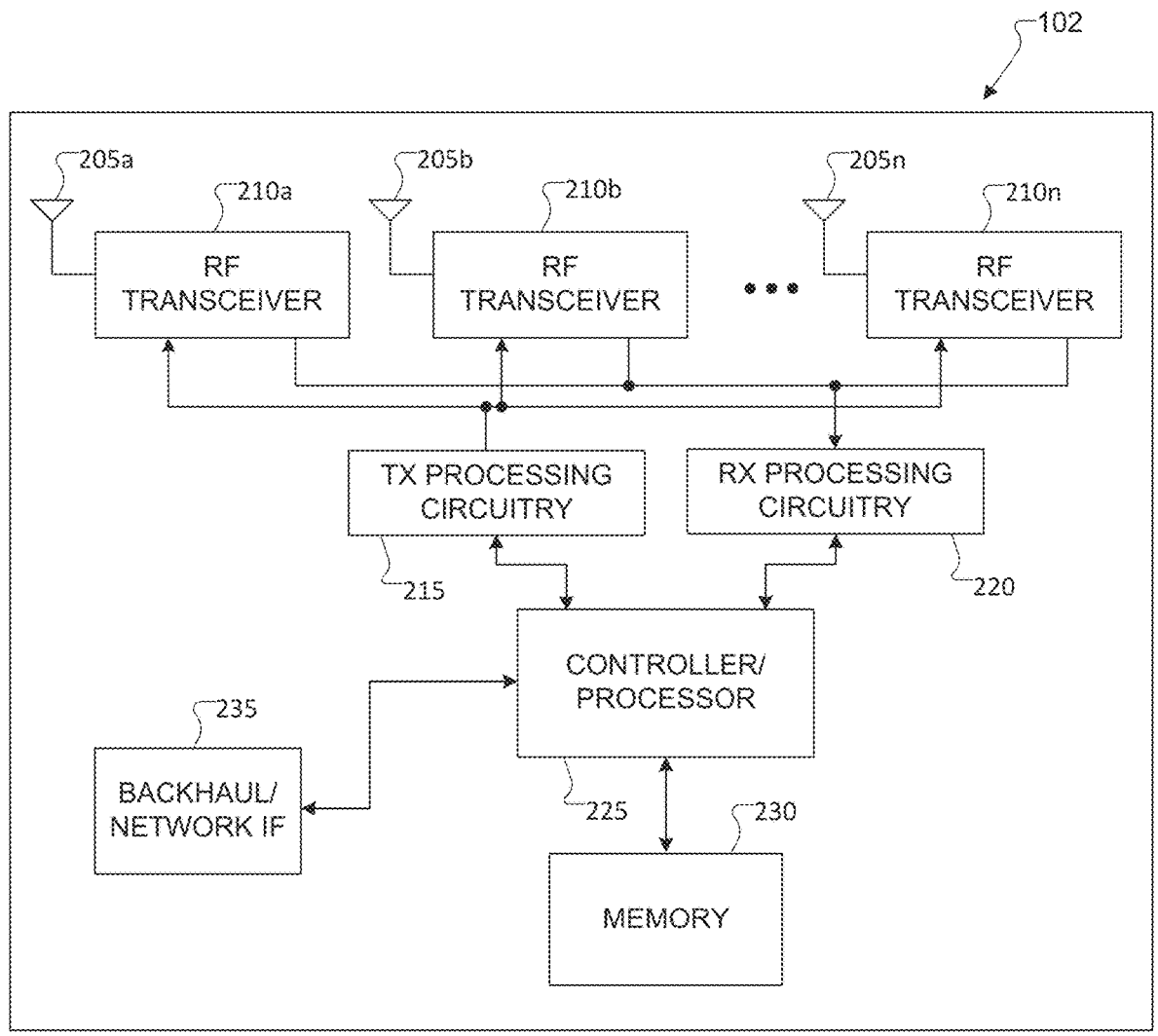
FIG. 2 illustrates an example gNB according to embodiments of the present disclosure.
Figure 3:
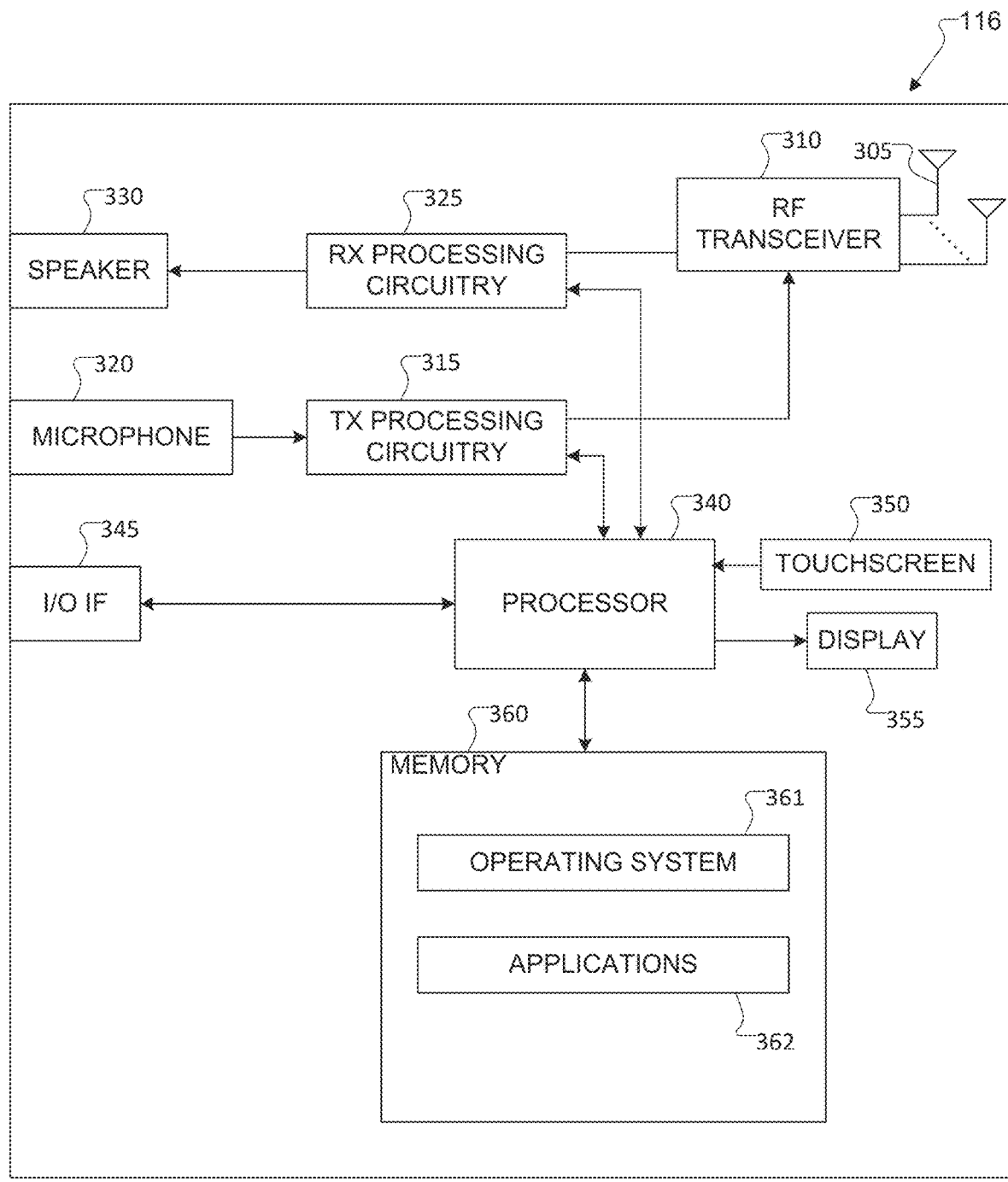
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the UEs 111-116 include circuitry, programing, or a combination thereof, to facilitate sounding reference signal (SRS) detection and handling. In certain embodiments, and one or more of the gNBs 101-103 includes circuitry, programing, or a combination thereof, for acquiring one or more sounding reference signals (SRSs) received from at least one gNB antenna; detecting antenna failure based on the one or more SRSs; estimating a noise power based on the antenna failure and history of received SRSs; detecting a missing SRS based on the noise power and the history of received SRSs; and handling the missing SRS based on performing at least one of: replacing an SRS measurement with a predicted SRS value for the missing SRS when the predicted SRS is available; or avoiding use of the missing SRS in a sequential SRS prediction when the predicted SRS is unavailable.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform sounding reference signal (SRS) detection and handling. Any of a wide variety of other functions can be supported in the gNB 102 by the controller/processor 225. In some embodiments, the controller/processor 225 includes at least one microprocessor or microcontroller.

In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 is also capable of executing programs and other processes resident in the memory 230, such as acquiring one or more sounding reference signals (SRSs) received from at least one gNB antenna; detecting antenna failure based on the one or more SRSs; estimating a noise power based on the antenna failure and history of received SRSs; detecting a missing SRS based on the noise power and history of received SRSs; and handling the missing SRS based on performing at least one of: replacing an SRS measurement with a predicted SRS value for the missing SRS when the predicted SRS is available; or avoiding use of the missing SRS in a sequential SRS prediction when the predicted SRS is unavailable. The controller/processor 225 is also capable of executing an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as SRS detection and handling algorithm, is stored in memory 230. The plurality of instructions is configured to cause the controller/processor 225 to perform sounding reference signal (SRS) detection and handling determined by the SRS detection and handling algorithm.

In certain embodiments, the transmit and receive paths of the gNB 102 (implemented using the RF transceivers 210a-210n, TX processing circuitry 215, and/or RX processing circuitry 220) support communication with aggregation of FDD cells and TDD cells.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for sounding reference signal (SRS) detection and handling. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
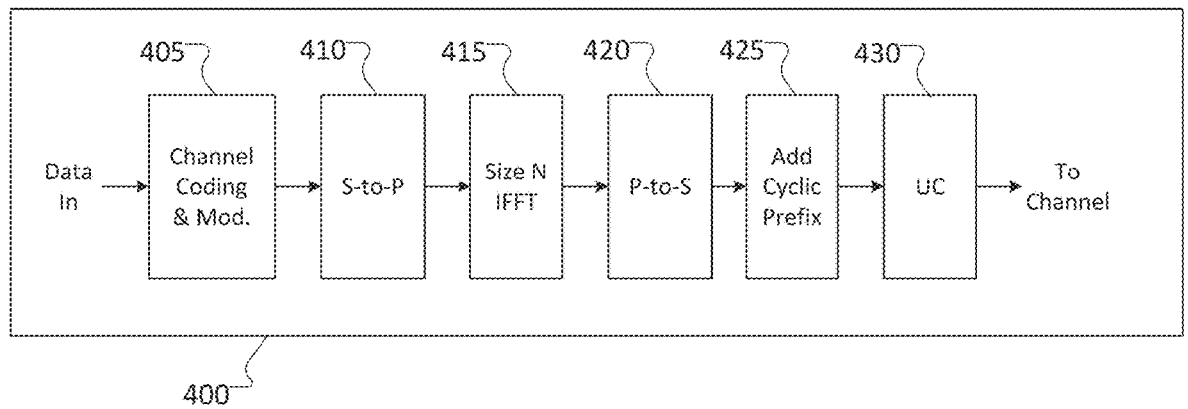
FIG. 4A illustrates a high-level diagram of an orthogonal frequency division multiple access transmit path according to embodiments of the present disclosure.
Figure 4B:
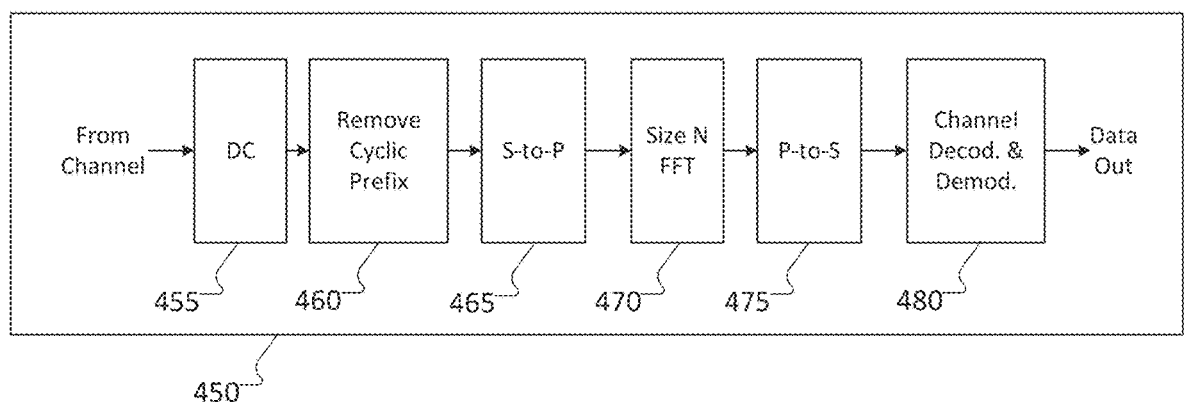
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information (CSI)-RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different Ms that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{rb}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct, e.g., acknowledgement (ACK), or incorrect, e.g., negative acknowledgement (NACK), detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

As operating frequency bands in NR become higher, the UE is evolving to accommodate a plurality of antenna panels to enhance aspects of multi-beam operation such as coverage enhancement, beam failure event minimization, fast beam switching, etc. Depending on hardware architectures, each panel on the UE 116 can perform multi-beam operation in a decoupled manner so that it is possible for the UE 116 to be capable of simultaneously DL/UL operations via multiple beam links, each of which corresponds to sufficiently reliable channels to independently communicate with gNB 102. The previous NR specification only allows multiple panels on UE 116 to be used for simultaneous DL reception or single panel selection for UL transmission in TDD operation.

Figure 5:
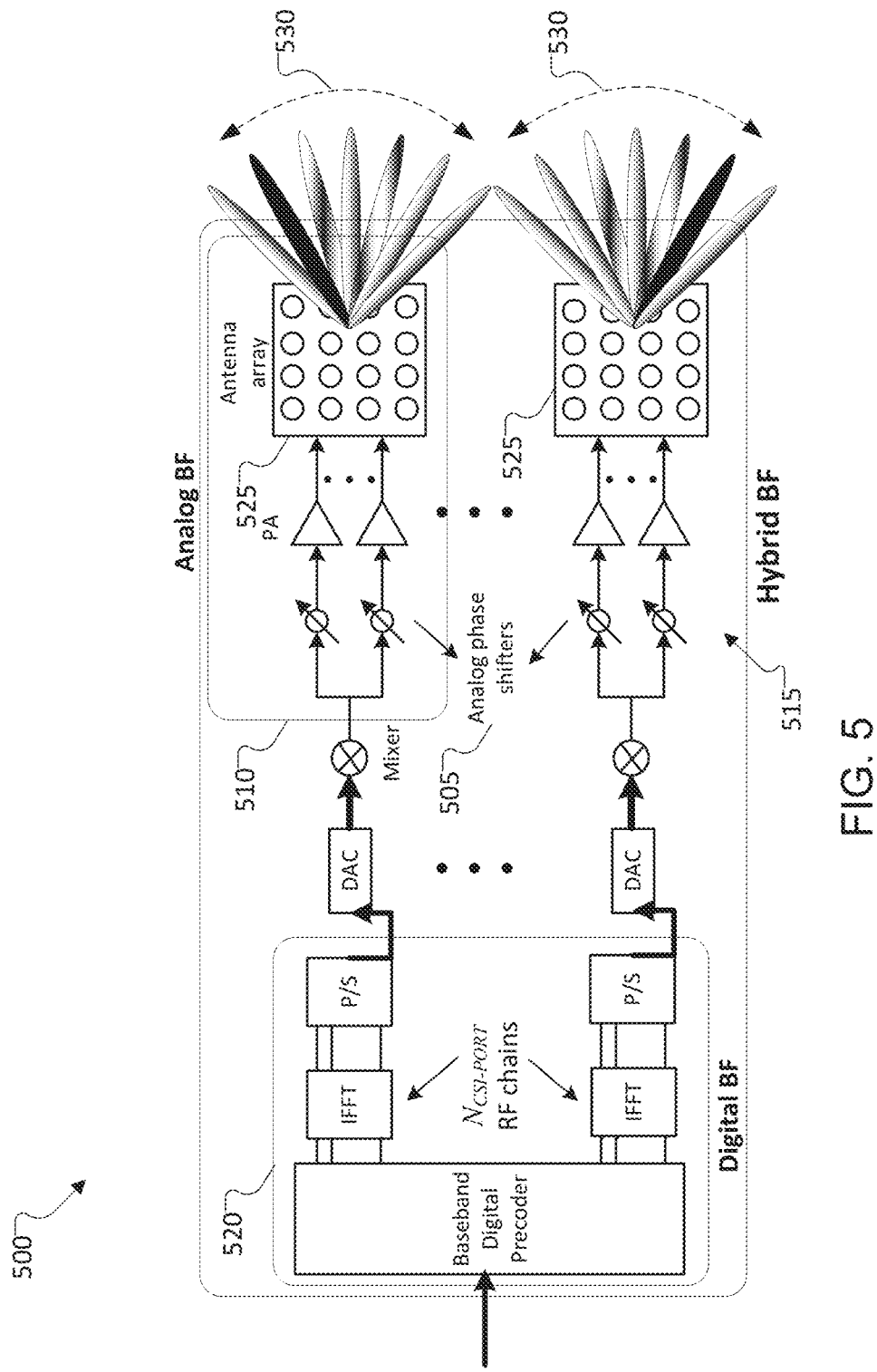
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

An antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A UE can be configured with a list of up to M transmission configuration indicator (TCI)-State configurations within the higher layer parameter PDSCH-Config to receive PDSCH in a serving cell where M depends on the UE capability maxNumberConfiguredTCIstatesPerCC. Each TCI-State contains parameters for configuring a QCL relationship between one or two downlink reference signals and the DMRS ports of the PDSCH, the DMRS port of a corresponding PDCCH, or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives a MAC-CE activation command to map up to N, such as N=8, TCI states to the codepoints of the DCI field 'Transmission Configuration Indication'. When the HARQ-ACK information corresponding to the PDSCH carrying the MAC-CE activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration $\mu$.

As operating frequency bands in NR become higher, the UE is evolving to accommodate a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. By utilizing the capability of multiple panels, UE 116 is able to obtain a variety of diversity gains, which comes from dynamic selection of panel(s) with the best quality in terms of performance that systems want to optimize. For example, in 3GPP 5G NR Rel-17, new features to facilitate UL beam/panel selection for UEs equipped with multiple panels is being identified and specified under a unified transmission configuration indicator (TCI) framework, in order to mitigate UL coverage loss from several aspects such as maximum permissible exposure (MPE) issues on UE 116.

For example, a beam corresponds to a spatial transmission/reception filter that is used by the UE 116 and/or gNB 102. In one example, a beam can correspond to a spatial reception filter that is used by the UE 116 to receive a reference signal, such as an synchronization signals (SS) and physical broadcast channel (PBCH) (SS/PBCH block (SSB)) and/or a CSI-RS and so on. In another example, a beam can correspond to a spatial transmission filter that is used by the UE 116 to transmit a reference signal, such as an UL sounding reference signal (SRS) and so on.

A beam training and measurement procedure can include, for example, a procedure wherein the gNB 102 configures the UE 116 with a set of reference signal (RS) resources, such as SSB resources and/or CSI-RS resources, as well as a configuration for report settings, such that the UE can report beam quality metric(s) measurement(s), such as Reference Signal Received Power (RSRP), Reference Signal Received Quality (RSRQ), Received Signal Strength Indicator (RSSI), Signal to Noise Ratio (SNR), Signal to Interference and Noise Ratio (SINR), and so on, each of which can be, e.g., a L-1 measurement or a filtered L-3 measurement. In one example, a UE 116 and/or a gNB 102 can transmit a reference signal (RS), such as a Synchronization Signal Block (SSB) or a CSI-RS or an SRS with a number of repetitions using a same spatial transmission filter in multiple occasions, so that the gNB 102 and/or UE 116, respectively, can receive the RS with different spatial reception filters, in order to facilitate beam sweeping and identification of a candidate/best beam based on a quality metric, such as L1/L3 RSRP or SINR. In one example, a selection of different spatial reception filters and/or quality metric and/or selection procedure can be per UE/gNB implementation.

A beam indication procedure can include, for example, a procedure wherein the gNB 102 can indicate to the UE 116 to transmit an uplink channel (and/or a second uplink signal) with a same spatial filter that was used to receive a (first) reference signal. In another example, the gNB 102 can indicate to the UE 116 to receive a downlink channel (and/or a second downlink signal) with a same spatial filter that was used to receive a (first) reference signal. Such indication can be, e.g., a DCI and/or MAC-CE, and/or radio resource control (RRC) signaling.

In one example, an antenna panel or, simply a panel, can refer to an antenna array 525 or an antenna sub-array connected to one or multiple RF chains. In one example, a panel can be referred to as a transmission-reception entity (TRE), which can virtualize multiple physical panels into a single virtual panel, based on a transparent UE/gNB implementation, such as MIMO diversity scheme(s).

In previous NR configurations, such as up to release 17 (Rel-17 NR), multiple panels on the UE have been primarily used for simultaneous DL reception or single panel selection for UL transmission, respectively, which could correspond to some limited capability of what multiple panels on UE are able to do. Depending on hardware architectures, as an example, each panel on UE 116 is able to perform multi-beam operation in a decoupled manner so that the UE 116 is capable of simultaneously DL and UL operations via multiple beam links, each of which corresponds to sufficiently reliable channels to independently communicate with gNB 102. Here, the multiple beam links could be associated with one or multiple panels. For example, each of the beam links can have a different associated panel. Accordingly, it is expected that more features of the multi-beam operation to exploit the capability of UE having massive multiple panels will be specified to further improve performance of multi-beam UE in the future standard releases.

In addition to multi-beam operation, dynamic TDD is one of the key features of NR that allows that a slot, or one or more parts of a slot, is dynamically allocated to either uplink or downlink as part of the scheduler decision. Compared to LTE systems where the split between DL and UL resources in the time domain was semi-statically determined, dynamic TDD is able to provide more flexible/dynamic DL and UL resource allocation in parts of a slot or multiple slots, and thus it could improve several aspects such as load balancing between DL and UL resources, UL coverage, power saving issues, and so forth.

In NR, three different signaling mechanisms for dynamic TDD to provide information for UE on whether the resources are used for uplink or downlink transmission are: 1) dynamic signaling for the scheduled UE; 2) semi-static signaling using RRC; and 3) dynamic slot-format indication. Combinations of these three mechanisms are also supported. All of the signaling mechanisms for dynamic TDD can support "cell-specific" or "UE-specific" DL/UL resource allocation so far. For example, in the current NR standards, one or multiple UEs in a cell can be configured with a same DL/UL slot pattern which can contain DL, UL, and/or flexible slots. Then, for the flexible slots (if configured), DL/UL symbol patterns can be differently assigned for each of the UEs in a UE-specific manner. It has not been supported that DL/UL resources can be allocated in a "beam-specific" manner where different DL/UL resources can be allocated for each different beam link. This could limit the freedom associated with multi-beam links that are able to have different DL/UL directions, which could be independent, or partially independent, of each other.

Figure 6:
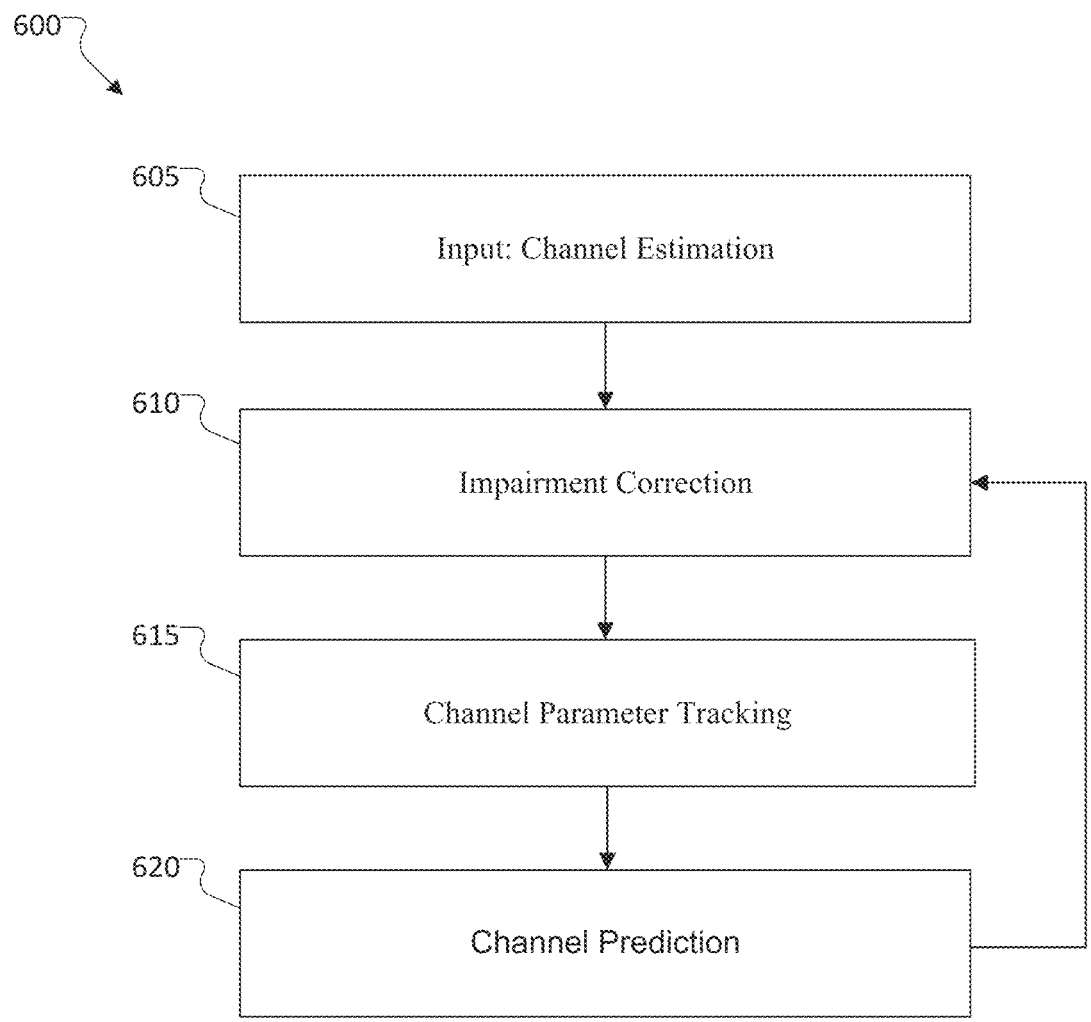
FIG. 6 illustrates a process for measurement impairment handling according to embodiments of the present disclosure.

FIG. 6 illustrates a process for measurement impairment handling according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The measurement impairment handling process 600 can be accomplished by processing circuitry in, for example, gNB 101, gNB 102, and gNB 103 in network 100.

Figure 7:
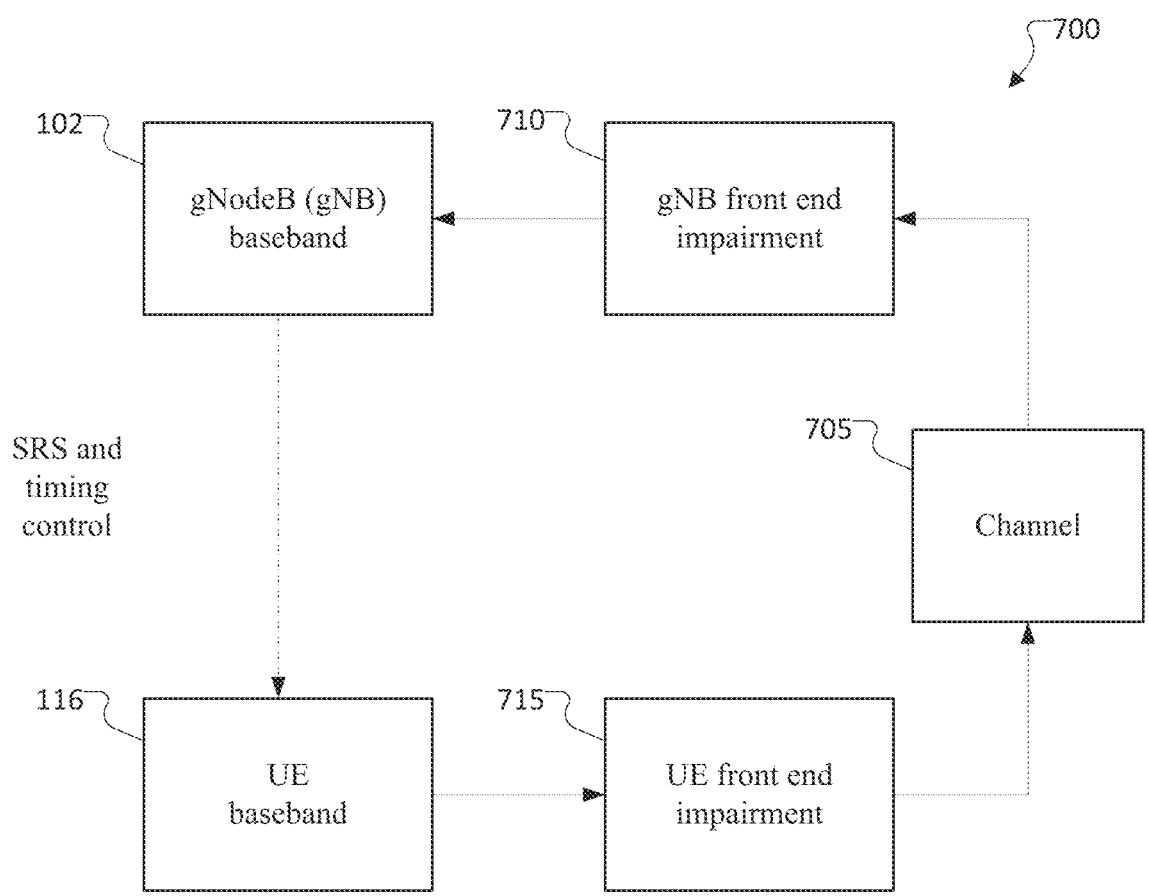
FIG. 7 illustrates an impairment diagram according to embodiments of the present disclosure.

The measurement impairment handling process 600 is described herein with respect to FIG. 7. FIG. 7 illustrates an impairment diagram according to embodiments of the present disclosure. The embodiment of the impairment diagram 700 shown in FIG. 7 is for illustration only. Other embodiments could be used without departing from the scope of the present disclosure.

In operation 605, channel estimation is performed. A base station, such as gNB 102, exchanges SRS and timing control with UE 116. The gNB 102 acquires one or more SRS from UE 116 from different gNB antennas via channel 705. Impairment may occur on a UE side or on a gNB side, or both. Based on the received SRSs, gNB 102 performs channel estimation and may identify an impairment in the gNB front end 710 or an impairment in the UE front end 715.

In operation 610, an impairment parameter is detected in the channel estimation and impairment correction is performed. The impairment may be the result of one or more of:
1) Timing Offset and Frequency Offset (TO/FO) impairment: TO/FO can cause random timing and phase shift for the signal received at BS. TO/FO can destroy the smoothness of (or the ability to track) channel time-variation, and prediction algorithms can fail based on example experiments in field data and simulations. Details of TO/FO impairment and correction can be found in U.S. patent application Ser. No. 17/129,797 filed Dec. 21, 2020 and entitled "Control for Mobility Channel Prediction"; U.S. patent application Ser. No. 17/143,957 filed Jan. 7, 2021 and entitled "Uplink Timing and Frequency Offset Estimation and Compensation for CSI Estimation and Tracking"; and U.S. patent application Ser. No. 17/143,130 filed Jan. 6, 2021 and entitled "Parameter Tracking for CSI Estimation", the contents of each is hereby incorporated by reference.
2) Missing SRS: due to measurement gap configuration or discontinuous reception (DRX) or Connected Mode DRX (CDRX) configuration or UE autonomous throttling, uplink sound reference signal may not be sent for some period of time. Missing these signals may cause degradation of channel parameter estimation and prediction performance. Missing an SRS can be caused by multiple reasons. For example, (1) UE autonomous throttling due to heat issue; (2) in dual-sim dual-standby (DSDS), if the SRS in one sim conflicts with higher priority operations in the other sim.
3) Prediction Model mismatch: A certain channel model can be used to fit the received uplink sounding signals, and the model can have some level of mismatch to reality. Such mismatch can also cause degradation in performance.
4) Power Control: An example issue can be that, in uplink transmission, the power can be fast changing due to (1) UE open loop power control, (2) transmission power control (TPC) command from gNB, and/or (3) carrier aggregation operation while the other carrier consumes dynamic power. Power uncertainty can cause SRS power fluctuation or can even cause the signal to appear to be "Dropped".
5) Timing jump due to timing advance (TA) command: a gNB can send TA command via Medium Access Control (MAC) Control Element (CE) to UE to change its uplink transmit timing. In an example, the adjustment can be 16 Ts, where Ts is sampling rate defined in LTE (1/30.72 MHz). In some cases, sudden large timing jump may not be preferred by tracking.

In operation 615 channel parameter tracking is performed. The gNB 102 tracks the impairment parameter identified in operation 610. For example, gNB 102 performs, based on the received SRS information, channel parameter tracking operations to generate channel parameters, wherein the channel parameter tracking operations are configured with different configuration parameters.

Thereafter, in operation 620, gNB 102 performs channel prediction. The terms "predicted channel"/"channel prediction", and the like, can refer to an estimated channel response for some time instances (which can be referred to as "future time instances"), where the estimation is performed using at least one of the channel responses of the time instances prior to the future time instances. The gNB 102 can use a prediction algorithm to employ one of the methods outlined herein below with respect to FIGS. 6-14 to perform impairment correction in operation 610. The gNB 102 performs, based on the channel parameters, a channel coefficient prediction operation to generate channel state information (CSI). The gNB 102 can output a result and repeat operations 610-615 as often as is required to correct the impairment.

Figure 8:
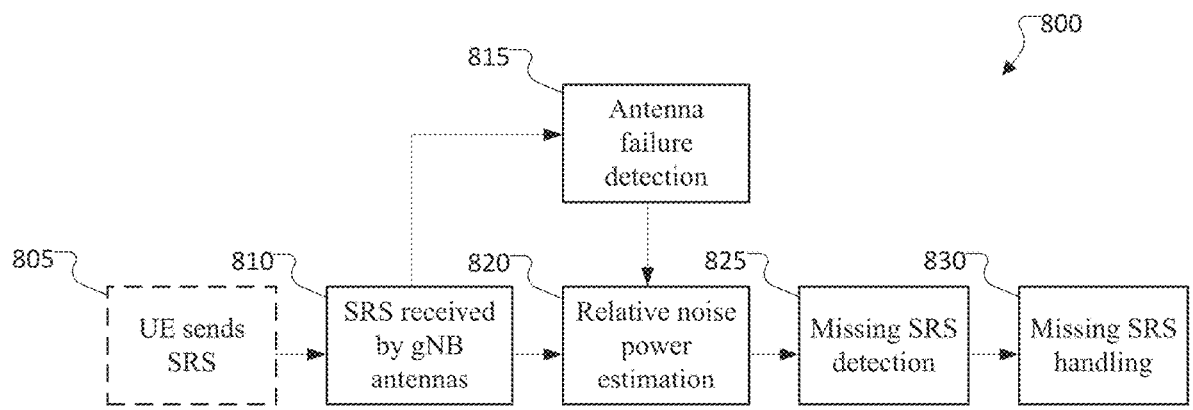
FIG. 8 illustrates an example process for handling one or more missing sounding reference signal (SRS) detection and handling process according to embodiments of the present disclosure.

FIG. 8 illustrates an example process for handling one or more missing sounding reference signals (SRSs) according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Process 800 can be accomplished by processing circuitry in, for example, gNB 101, gNB 102, and gNB 103 in network 100.

At operation 805, UE 116 is configured to transmit one or more SRSs in an UL channel. In certain embodiments, the number of SRS instances is more than one. In certain embodiments, one SRS instance is used. The gNB 102 receives, via multiple antennas at the gNB 102, the one or more SRSs in operation 810.

At operation 815, gNB 102 performs antenna failure detection. Antenna failure can refer to an antenna, such as the antenna at gNB 102, not being able to receive or transmit signals effectively. Antenna failure can be caused, for example, by hardware failure or RF control software glitch. In certain embodiments, antenna failure detection is possible for some gNB Rx RF front ends to fail and ADC generates zeros instead of a received signal or a noise. A channel prediction algorithm detects such a failure for power drop detection purposes and other possible purposes in the future.

At operation 820, gNB 102 performs relative noise power estimation. The gNB 102 can calculate average noise power based on targeted Signal-to-Noise Ratio (SNR) and average signal power. When an antenna fails, gNB 102 removes the failed antenna values from being averaged to make the estimation more accurate. In certain embodiments, gNB 102 detects an SRS power drop. For example, gNB 102 can skip TO/FO correction when SRS power drop is detected according to some criteria.

For detection, the received SRS power computed can be used to compare with preconfigured thresholds. In some embodiments, there are two conditions, and if they both are met, the SRS is considered to experience a power drop. The conditions are:
1) The power difference between the current and the previous valid SRS is less than the pre-configured threshold, that is, according to equation 1:

$$P_{prevValid}^{SRS} - P_{current}^{SRS} < P_{powerDrop}^{SRS,thre} \qquad (1)$$

2) The power difference between the current SRS power and the noise power is less than the pre-configured threshold, that is, according to equation 2:

$$P_{current}^{SRS} - P_{noise} < P_{powerDrop}^{noise,thre} \qquad (2)$$

In some embodiments, there are two SRS power values used for power drop detection: and $P_{current}^{SRS}$ The current SRS power ($P_{current}^{SRS}$) can be computed from another module and provided to the SRS power drop detection module. If no power drop is detected in the current SRS, the current SRS power value can be copied to the previous valid SRS power ($P_{prevValid}^{SRS}$) to be used in the next SRS power comparison. The initial $P_{prevValid}^{SRS}$ value can be set to 0.

An example process is provided as follows:

Step 1) If power drop handling is enabled, go to the next step.

Step 2) Compute the current SRS power using equation 3:

$$P_{current}^{SRS} = \Sigma_k P_k^{SRS} \quad (3)$$

Step 3) Scale the noise power using equation 4:

$$P_{noise} \leftarrow P_{noise} \times \frac{N_{ant} - \sum_k I_k^{antFail}}{N_{ant}} \quad (4)$$

Step 4) If $$10\log_{10}\frac{P_{current}^{SRS}}{P_{prevValid}^{SRS}} < 10\log_{10}P_{powerDrop}^{SRS,thre}$$

and $10\log_{10}\frac{P_{current}^{SRS}}{P_{noise}} < 10\log_{10}P_{powerDrop}^{noise,thre}$, then $b_{powerDrop}^{SRS} = $ true Step 5) If $b_{powerDrop}^{SRS}$ is true, $P_{prevValid}^{SRS} \leftarrow P_{current}^{SRS}$ The noise power can be computed by multiplying the noise variance by the number of subband RBs and the number of antennas for a fair comparison with the SRS power. In this computation, an additional scaler $$\left(\frac{N_{ant} - \sum_k I_k^{antFail}}{N_{ant}}\right)$$

can be multiplied in order to take the failed antennas into account.

If a power drop is detected in the current SRS, the power drop handling method can be triggered. The approach to handling SRS power drops described in this section is substitution (as described further with respect to FIG. 10). The substitution method is to substitute SRS measurements with channel prediction. Using the substitution method, the rest of channel prediction processing needs no further changes to handle low-power SRS and the predicted channel can work like a measurement.

In certain embodiments, the predicted channel for the current Transmission Time Interval (TTI) has been generated for TO/FO correction and is stored in memory, such as memory 230. Instead of the low-power SRS measurement, the predicted channel can be pushed to the buffer. Thus, the TO/FO correction that was going to be performed for the SRS measurement can be skipped because the predicted channel is assumed to be TO/FO free, and it proceeds to channel path parameter tracking.

In operation 825, missing SRS detection is performed. The gNB 102 can detect a missing SRS based on the relative noise power estimation in block 820. Missing SRS, or dropping SRS, can result from an SRS power fluctuating a lot across time due to channel fading as well as uplink power control. To decide if an instance of SRS reception missed or not, the following two conditions are checked:

1) SRS power becomes extremely small in comparison with historical SRS power (see Equation 1). It handles the case where SRS power is large and has suddenly, dramatically dropped (but still above noise floor).

2) SRS power is even smaller than noise power (See Equation 2). It handles the case where SRS power is small and when below noise floor, it is considered dropped.

Therefore, for detection, the received SRS power computed is used to compare with the preconfigured thresholds. There are two conditions, and if they both are met, the SRS is considered to experience a power drop. The conditions are:

1) The power difference between the current and the previous valid SRS is less than the pre-configured threshold, that is according to equation 5:

$$P_{prevValid}^{SRS} - P_{current}^{SRS} < P_{powerDrop}^{SRS,thre} \quad (5)$$

2) The power difference between the current SRS power and the noise power is less than the pre-configured threshold, that is according to equation 6:

$$P_{current}^{SRS} - P_{noise} < P_{powerDrop}^{noise,thre} \quad (6)$$

There are two SRS power values used for power drop detection: $P_{current}^{SRS}$ and $P_{prevValid}^{SRS}$. As described herein above with respect to operation 820, the current SRS power ($P_{current}^{SRS}$) is computed and is given to the SRS power drop detection module. If no power drop is detected in the current SRS, the current SRS power value is copied to the previous valid SRS power ($P_{prevValid}^{SRS}$) to be used in the next SRS power comparison. The initial $P_{prevValid}^{SRS}$ value can be set to 0.

Therefore gNB 102 can detect a missing SRS based on the relative noise power estimation in block 820. Missing SRS, or dropping SRS, results from an SRS power fluctuating a lot across time due to channel fading as well as uplink power control (UPC). To decide if an instance of SRS reception is missed or not, the following two conditions are check: 1) SRS power becomes extremely small in comparison with historical SRS power (see Equation 5), which handles the case in which SRS power is large and suddenly, dramatically drops but remains above a noise floor; and 2) SRS power is even smaller than noise power (see Equation 6), which handles the case in which SRS power is small and, when below the noise floor, the SRS power is considered dropped. The gNB 102 further can compute $P_{prevValid}^{SRS}$ and store the computed value in a software memory, such as, in Digital Signal Processor (DSP), a Field Programmable Gate Array (FPGA), or memory 230.

In operation 830, missing SRS handling is performed in response to the missing SRS detection in operation 825. If a power drop is detected in the current SRS, missing SRS handling can be triggered. In certain embodiments, gNB 102 handles SRS power drops by substitution. The substitution method is to substitute SRS measurements with a channel prediction. Using the substitution method, the rest of channel prediction processing needs no further changes to handle low-power SRS and the predicted channel can work like a measurement. The predicted channel at the time instance where the SRS is dropped can be regarded as the received SRS and can be used for all the signal processing performed as if there is no SRS missed. If a predicted SRS is unavailable for the missing SRS, gNB 102 marks the SRS as missing. The gNB 102 marks this particular missing SRS so that the particular missing SRS is not used in the sequential SRS prediction.

Figure 9:
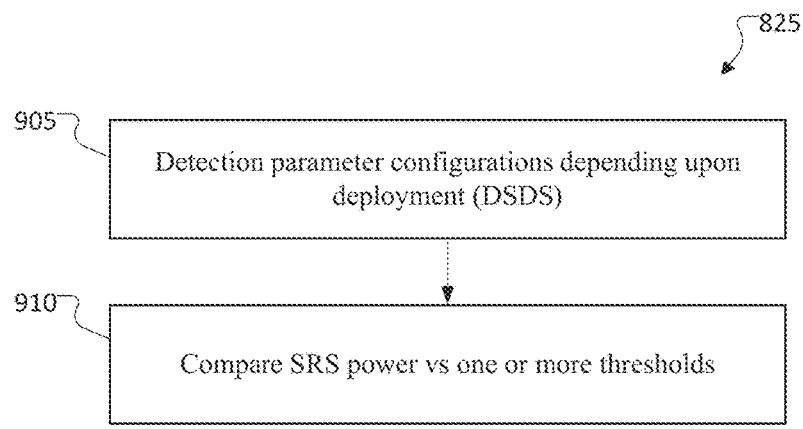
FIG. 9 illustrates missing SRS detection process according to embodiments of the present disclosure.

FIG. 9 illustrates missing SRS detection process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Process 825 can be accomplished by processing circuitry in, for example, gNB 101, gNB 102, and gNB 103 in network 100.

In operation 905, gNB 102 obtains detection parameter configurations. The detection parameter configurations can be obtained based on a deployment factor. For example, when DSDS (dual-sim dual-standby) is enabled for one operator, then there is a high likelihood that SRS dropping will occur, and then gNB 102 can set a threshold such that SRS dropping can be detected at a low threshold. When no DSDS is enabled and no Carrier Aggregation (CA) is enabled, the likelihood of SRS dropping is low, and then gNB 102 can set a threshold such that SRS dropping is detected at a high threshold.

In operation 910, gNB 102 applies one or more thresholds to determine a missing SRS. For example, gNB 102 can apply a first threshold for SRS power versus previous power as noted in Equation 7. Additionally, gNB 102 can apply a second threshold comparing SRS power versus a noise power as shown in Equation 8. In certain embodiments, only one threshold is applied. In certain embodiments, two or more thresholds are applied.

$$P_{current}^{SRS} - P_{previous}^{SRS} < P_{threshold1} \quad (7)$$

$$P_{current}^{SRS} - P_{noise} < P_{threshold2} \quad (8)$$

In certain embodiments, gNB 102 obtains a carrier aggregation (CA) configuration. SRS power drop detection can be related to CA operations. In a CA scenario, power scaling can happen frequently for SRS, as SRS has least priority and its power can be scaled dynamically depending on other channels. In these embodiments, CA configuration may be used as an input to configure an SRS power detection algorithm. CA configuration can include how many carriers are configured, intra-band or inter-band, what are the bandwidths for different carriers, and the like. The more CA configured, the higher chance the power for SRS will be consumed by another different carrier and thus one may configure the missing SRS detection threshold lower such that the SRS dropping event can be detected with a lower bar (as it happens more often). Therefore, gNB 102 is configured to adjust the SRS detection threshold based on the CA configuration.

In certain embodiments, gNB 102 obtains configuration information via the DCI. The SRS power drop detection can be related to the flexible symbol configurations, triggered by the DCI. In this case, if an uplink symbol intended to transmit SRS is now configured as downlink, the SRS will be dropped. In these embodiments, DCI information of flexible symbol configurations are used as priori information to configure SRS power drop detection algorithms. Therefore, gNB 102 is configured to adjust the SRS power drop detection threshold based on the DCI. In certain embodiments, the DCI comprises DCI in a Physical Downlink Control Channel (PDCCH) of flexible configurations.

In certain embodiments, SRS power drop detection is caused by flexible symbol configurations dynamically triggered by Physical Downlink Control Channel (PDCCH). In this case, if an uplink symbol intended to transmit SRS is now configured by PDCCH as downlink symbol, the SRS will be dropped. In these embodiments, gNB 102 uses DCI information in PDCCH of flexible symbol configurations to configure SRS power drop detection algorithms. For example, whenever PDCCH configures an uplink symbol containing SRS to be downlink symbol, then gNB 102 marks and drops this SRS.

In certain embodiments, gNB 102 detects the missing SRS by using other uplink channels or reference signals. For example, gNB 102 can detect the missing SRS by applying one or more of a Demodulation Reference Signal (DMRS) or a Physical Uplink Shared Channel (PUSCH).

Figure 10:
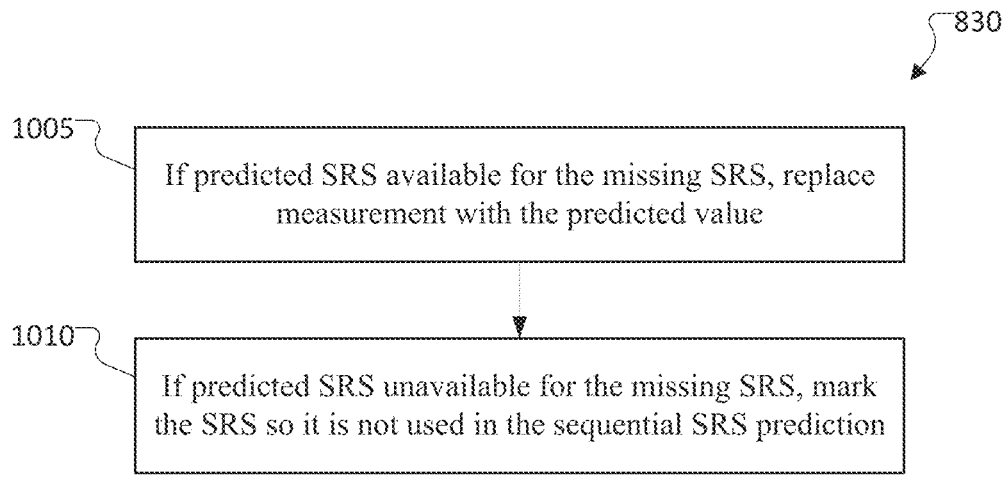
FIG. 10 illustrates missing SRS handling process according to embodiments of the present disclosure.

FIG. 10 illustrates missing SRS handling process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Process 830 can be accomplished by processing circuitry in, for example, gNB 101, gNB 102, and gNB 103 in network 100.

In response to the missing SRS detection, the missing SRS handling process 830 is triggered in which gNB 102 attempts to substitute the missing SRS with a predicted SRS or marks the SRS to not be used. If a power drop is detected in the current SRS, missing SRS handling gets triggered. In the substitution method, gNB 102 determines if a predicted SRS is available for the missing SRS. If a predicted SRS is available for the missing SRS, gNB 102 replaces the SRS measurements with the predicted value in operation 1005. Using the substitution method, the rest of channel prediction processing needs no further changes to handle low-power SRS and the predicted channel can work like a measurement. The predicted channel at the time instance where the SRS is dropped can be regarded as the received SRS and can be used for all the signal processing performed as if there is no SRS missed. If a predicted SRS is unavailable for the missing SRS, gNB 102 marks the SRS so that the SRS is not used in the sequential SRS prediction in operation 1010.

Figure 11:
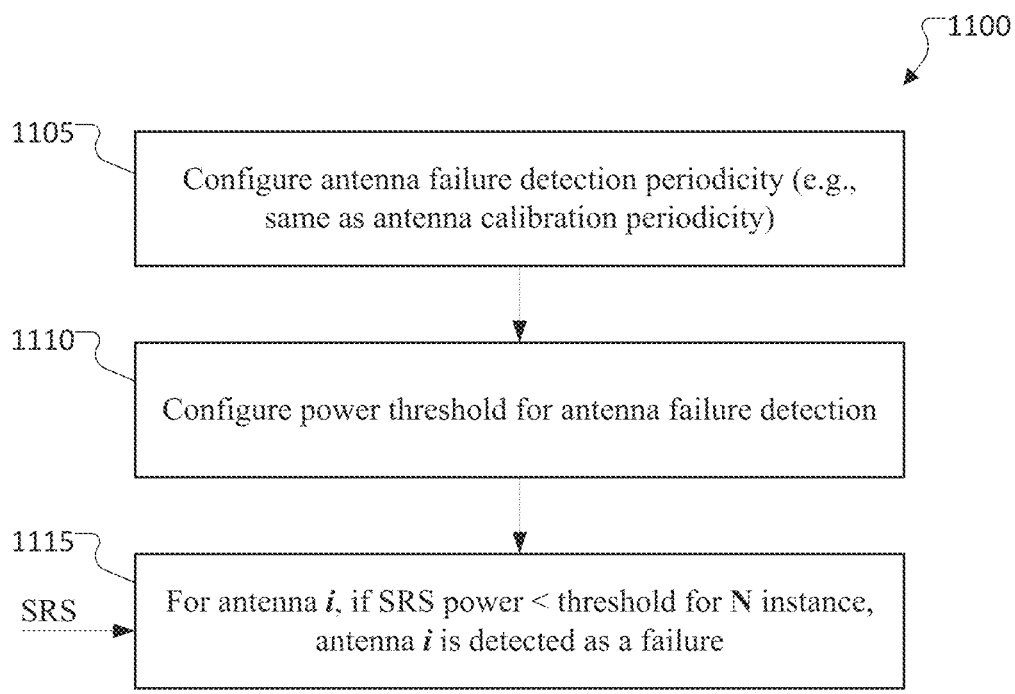
FIG. 11 illustrates antenna failure detection according to embodiments of the present disclosure.

FIG. 11 illustrates antenna failure detection according to embodiments of the present disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Process 1100 can be accomplished by processing circuitry in, for example, gNB 101, gNB 102, and gNB 103 in network 100.

In certain embodiments for antenna failure detection, it is possible for some gNB Rx RF front ends to fail and the ADC generates zeros instead of a received signal or a noise. The gNB 102 channel prediction algorithm detects such a failure for power drop detection purposes and other possible purposes in the future. Antenna failure is detected by gNB 102 comparing the received SRS power of each antenna ($P_k^{SRS}$) with the pre-configured threshold ($P_{ant}^{thre}$). The binary vector of the comparison results is the output of the antenna failure detection. An example process is provided below:

Step 1) If enAntFailHandling is true, go to the next step.
Step 2) Perform the comparison, $I_k^{antFail} = P_k^{SRS} \leq P_{ant}^{thre}$ for all $k^{th}$ antennas.

Therefore, in operation 1105, gNB 102 configures an antenna failure detection periodicity. That is, gNB 102 sets a period to establish how frequently gNB 102 will search or evaluate for antenna failures. Since antenna failures are not dynamic, but are rather more semi-static, checking for antenna failure does not need to occur frequently, which can be a waste of resources. First, gNB 102 configures the antenna failure detection periodicity to set how often gNB 102 will check the antenna functionality. In certain embodiments, gNB 102 can adjust or configure the antenna failure detection periodicity to match an antenna calibration periodicity. In operation 1110, gNB 102 configures power threshold for antenna failure detection. That is, gNB 102 may configure the power threshold based on one or more hardware specifications of a respective antenna. The gNB 102 receives the SRS input and computes, for each antenna (i), an SRS power per antenna (i). Then, gNB 102 compares the computed SRS power for each antenna (i) vs a threshold for each instance (N) in operation 1115 to identify an antenna failure. The N instances can be consecutive or non-consecutive. If the SRS power for antenna (i) is constantly low for the N instances, then gNB 102 determines that the antenna (i) has failed or is otherwise not working. For example, for antenna i, if SRS power<threshold for N instance, antenna i is detected as failure.

Figure 12:
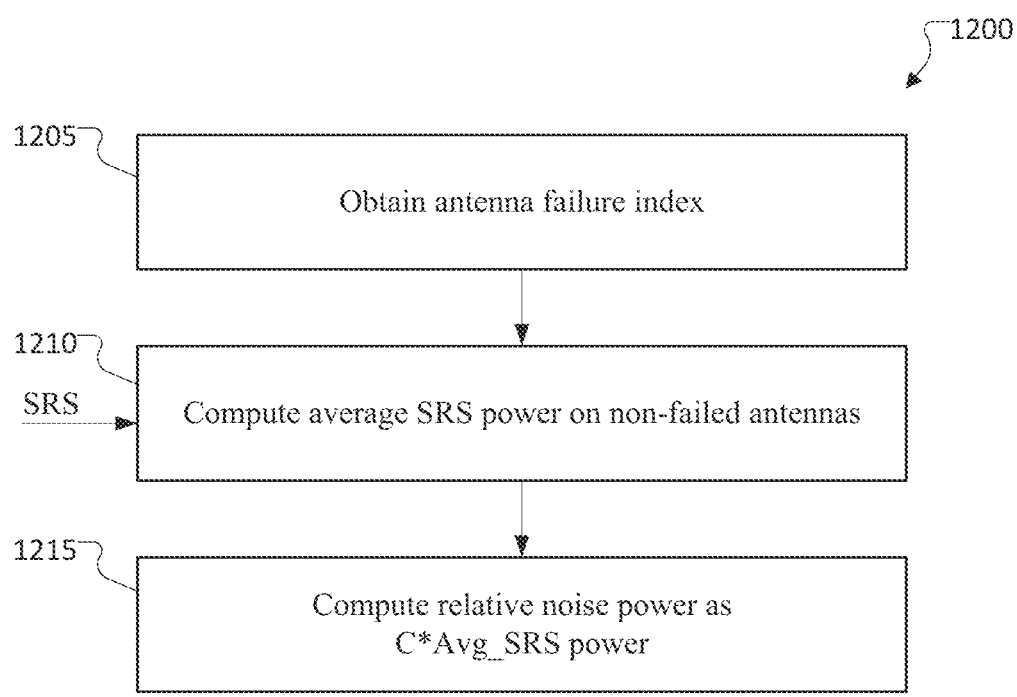
FIG. 12 illustrates antenna failure handling and noise estimation according to embodiments of the present disclosure.

FIG. 12 illustrates antenna failure handling and noise estimation according to embodiments of the present disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Process 1200 can be accomplished by processing circuitry in, for example, gNB 101, gNB 102, and gNB 103 in network 100.

In operation 1205, gNB 102 obtains an antenna failure index. The antenna failure index may have been previously calculated or determined, and stored in memory 230. In operation 1210, gNB 102 computes an average SRS power on non-failed antennas. That is, gNB 102 computes an average SRS power for the functional antennas. For example, gNB 102 may compute the average SRS power based on a power detection algorithm. In operation 1210, gNB 102 computes a relative noise power as C*Avg_SRS power, in which C may be an inverse of targeted SINR.

Figure 13:
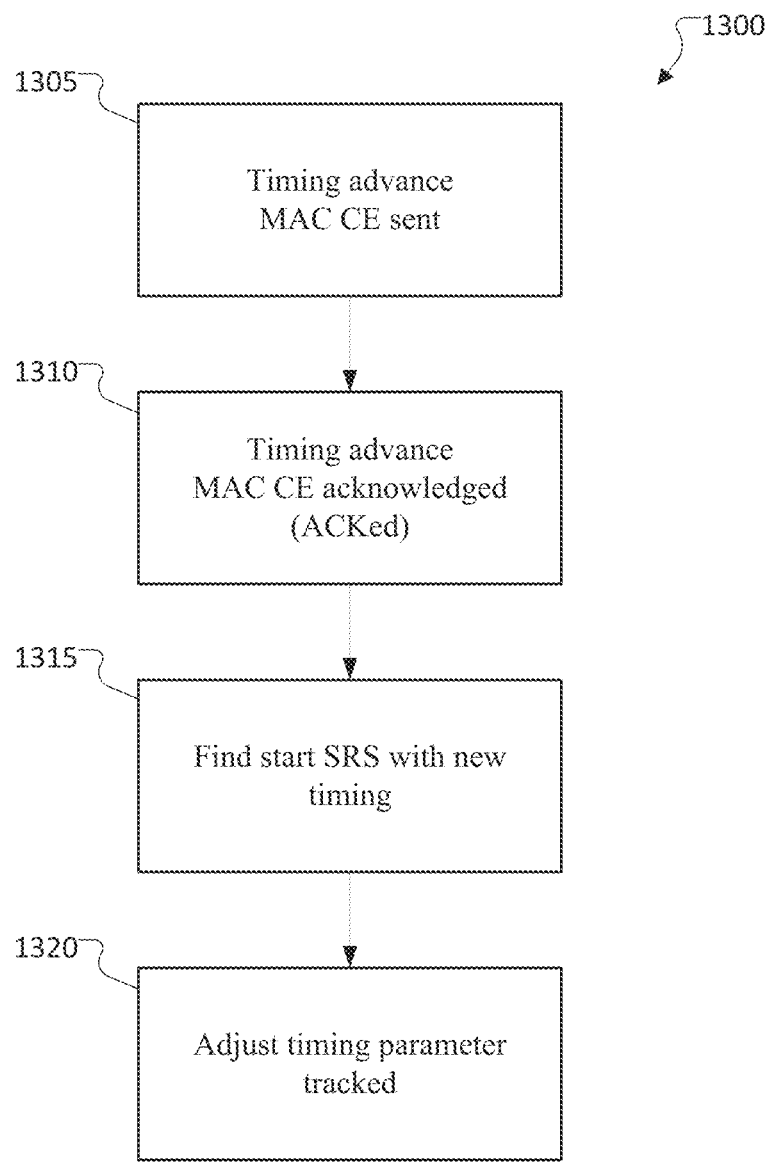
FIGS. 13 and 14 illustrate timing advance detection according to embodiments of the present disclosure.
Figure 14:
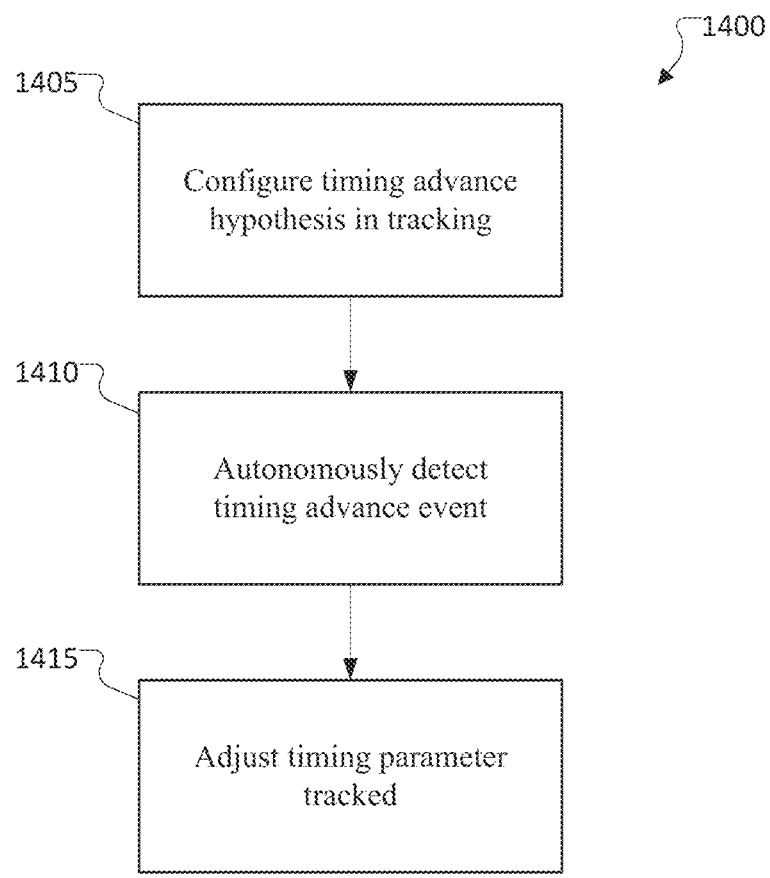

FIGS. 13 and 14 illustrate example timing advance detection according to embodiments of the present disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Processes 1300 and 1400 can be accomplished by processing circuitry in, for example, gNB 101, gNB 102, and gNB 103 in network 100.

In certain embodiment, a set of timing offset hypotheses is configured by a control layer where the selection of the hypotheses depends on the cell deployment and/or UE timing offset and frequency offset estimation history from other modules. Timing offset is estimated based on the configured hypotheses, for example, the estimated timing offset can be the hypothesis corresponding to the maximum correlation value calculated between a reference signal and the newly measured signal.

Letting $y_{k,m}$ be the most recent SRS channel estimate at the $k^{th}$ antenna and the $m^{th}$ RB. $I_{HT}=\{-l_{maxTO}, \ldots, l_{maxTO}\}$ Equation 9 denotes a set of integer timing offsets for hypothesis testing.

$$I_{HT}=\{-l_{maxTO}, \ldots, l_{maxTO}\} \quad (9)$$

An example pseudo code of the hypothesis testing is provided below:

```
α_m ← Σ_k y_{k,m}^{ref} · y*_{k,m}, ∀m
P_k^{SRS} ← Σ_m |y_{k,m}|^2, ∀k
foreach l_{TO} ∈ I_{HT} do
    i ← i + 1
    a ← Σ_m α_m · e^{j2πmΔf_{rb}l_{TO}T_s}
    c_i ← |a|
    φ_i ← ∠a
end for
i_max ← argmax_i (c_i)
Find the index i_{noTO} ← I_{HT}(i_{noTO}) = 0
    if i_max ≠ i_{noTO}
        if 10log10(c_{i_max}/c_{i_noTO}) <T_{corr}
            i_max = i_{noTO}
    end
endl_{TO} ← I_{HT}(i_max)
                φ_{FO} ← φ_{i_max}
```

The complexity of timing offset hypotheses testing is low and thus it is possible to compute more hypotheses that have finer timing offset resolution. Therefore, it is possible to correct timing offset continuously on incoming receiving SRS.

In some embodiments, the timing offset hypotheses set can be configured within a small range and an additional two hypotheses are configured for timing advance (TA) detection, for example +/−16 Ts.

In operation 1305, a TA command is sent via Medium Access Control (MAC) Control Element (CE). For example, gNB 102 can send the TA command to UE 116. In operation 1310, UE 116 feeds back an Acknowledgement signal (ACK) indicating that UE 116 has successfully received the TA command. Whenever TA MAC CE is sent and successfully received by the UE, and gNB 102 receives the ACK for the MAC CE in operation 1310, gNB 102 knows that UE 116 will adjust its timing to the new configuration. Therefore, gNB 102 finds the new start SRS according to the new timing in operation 1315. The gNB 102 can also adjust the timing parameter tracked by gNB 102 accordingly in operation 1320.

Alternatively, in operation 1405, gNB 102 configures the timing advance hypothesis in tracking. In operation 1410, the gNB 102 autonomously (for example, without user input) detects a timing advance event. That is, the gNB 102 detection algorithm detects timing advance autonomously by continuously monitoring for each SRS received and checking if there is a large timing jump, such as a TA level. If so, the gNB 102 detection algorithm will declare the timing advance is detected and gNB 102 can adjust the tracked timing accordingly in operation 1415.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A method comprising:
receiving, via at least one gNB antenna, one or more sounding reference signals (SRSs);
detecting an antenna failure based on the one or more SRSs;
estimating a noise power based on the antenna failure and a history of received SRSs;
detecting a missing SRS based on the noise power and the history of received SRSs; and
handling the missing SRS based on performing at least one of:
replacing an SRS measurement with a predicted SRS value for the missing SRS when the predicted SRS value is available, and
avoiding use of the missing SRS in a sequential SRS prediction when the predicted SRS value is unavailable.

2. The method of claim 1, wherein detecting the missing SRS comprises:
obtaining a carrier aggregation (CA) configuration; and
adjusting an SRS detection threshold based on the CA configuration.

3. The method of claim 1, wherein detecting the missing SRS comprises:
obtaining downlink control information (DCI); and
configuring an SRS power drop detection based on the DCI.

4. The method of claim 1, wherein detecting the missing SRS comprises:
obtaining parameter configurations based on a dual-sim, dual-standby (DSDS); and
evaluating an SRS power based on at least one threshold,
the method further comprising:
comparing a difference between the SRS power and a history of SRS against a first threshold; and
comparing a difference between the SRS power and a noise power against a second threshold.

5. The method of claim 1, wherein detecting the antenna failure based on the one or more SRSs comprises:
configuring an antenna failure detection periodicity;
configuring a power threshold for antenna failure detection; and
detecting, for one more antennas, the antenna failure based on comparison of an SRS power value associated with the one or more SRSs to the power threshold.

6. The method of claim 1, wherein estimating the noise power based on the antenna failure comprises:
obtaining an antenna failure index;
determining, based on the one or more SRSs, an average SRS power on each non-failed antenna; and
determining a relative noise power as a function of the average SRS power.

7. The method of claim 1, wherein detecting the antenna failure based on the one or more SRSs comprises performing detection of a timing advance by:
transmitting a timing advance medium access control (MAC) control element (CE);
in response to receiving a MAC CE acknowledgement, identifying a starting SRS with a new timing; and
adjusting, based on the identified new timing, a tracked timing parameter for the timing advance.

8. A base station comprising:
one or more antennas;
a transceiver operably connected to the one or more antennas, the transceiver configured to receive one or more sounding reference signals (SRSs); and
a processor operably connected to the one or more antennas, the processor configured to:
detect an antenna failure based on the one or more SRSs;
estimate a noise power based on the antenna failure and a history of received SRSs;
detect a missing SRS based on the noise power and the history of received SRSs; and
handle the missing SRS by at least one of:
replacement of an SRS measurement with a predicted SRS value for the missing SRS when the predicted SRS value is available, and
avoidance of use of the missing SRS in a sequential SRS prediction when the predicted SRS value is unavailable.

9. The base station of claim 8, wherein to detect the missing SRS, the processor is configured to:
obtain a carrier aggregation (CA) configuration; and
adjust an SRS detection threshold based on the CA configuration.

10. The base station of claim 8, wherein to detect the missing SRS, the processor is configured to:
obtain a downlink control information (DCI); and
configure an SRS power drop detection based on the DCI.

11. The base station of claim 8, wherein to detect the missing SRS, the processor is configured to:
obtain parameter configurations based on a dual-sim, dual-standby (DSDS); and
evaluate an SRS power based on at least one threshold,
wherein the processor is further configured to:
compare a difference between the SRS power and a history of SRS against a first threshold; and
compare a difference between the SRS power and a noise power against a second threshold.

12. The base station of claim 8, wherein to detect the antenna failure based on the one or more SRSs, the processor is configured to:
configure an antenna failure detection periodicity;
configure a power threshold for antenna failure detection; and
detect, for one more antennas, the antenna failure based on comparison of an SRS power value associated with the one or more SRSs to the power threshold for each antenna.

13. The base station of claim 8, wherein to estimate the noise power based on the antenna failure, the processor is configured to:
obtain an antenna failure index;
determine, based on the one or more SRSs, an average SRS power on each non-failed antenna; and
determine a relative noise power as a function of the average SRS power.

14. The base station of claim 8, wherein to detect the antenna failure based on the one or more SRSs, the processor is configured to perform detection of a timing advance by:
transmitting a timing advance medium access control (MAC) control element (CE);
in response to receiving a MAC CE acknowledgement, identifying a starting SRS with a new timing; and
adjusting, based on the identified new timing, a tracked timing parameter for the timing advance.

15. A non-transitory computer readable medium comprising a plurality of instructions that, when executed by at least one processor, is configured to cause the at least one processor to:

receive, via at least one gNB antenna, one or more sounding reference signals (SRSs);

detect an antenna failure based on the one or more SRSs;

estimate a noise power based on the antenna failure and a history of received SRSs;

detect a missing SRS based on the noise power and the history of received SRSs; and handle the missing SRS based on at least one of:
- replacement of an SRS measurement with a predicted SRS value for the missing SRS when the predicted SRS value is available, and
- avoidance of a use of the missing SRS in a sequential SRS prediction when the predicted SRS value is unavailable.

16. The non-transitory computer readable medium of claim 15, wherein to detect the missing SRS, the plurality of instructions is configured to cause the processor to at least one of:
- obtain a carrier aggregation (CA) configuration, and adjust an SRS detection threshold based on the CA configuration; or
- obtain a downlink control information (DCI), and configure an SRS power drop detection based on the DCI.

17. The non-transitory computer readable medium of claim 15, wherein to detect the missing SRS, the plurality of instructions is configured to cause the processor to:
- obtain parameter configurations based on a dual-sim, dual-standby (DSDS); and
- evaluate an SRS power based on at least one threshold, and wherein the plurality of instructions is further configured to cause the processor to:
- compare a difference between the SRS power and a history of SRS against a first threshold; and
- compare a difference between the SRS power and a noise power against a second threshold.

18. The non-transitory computer readable medium of claim 15, wherein to detect the antenna failure based on the one or more SRSs, the plurality of instructions is configured to cause the processor to:
- configure an antenna failure detection periodicity;
- configure a power threshold for antenna failure detection; and
- detect, for one more antennas, the antenna failure based on comparison of an SRS power value associated with the one or more SRSs to the power threshold for each antenna.

19. The non-transitory computer readable medium of claim 15, wherein to estimate a relative noise power based on the antenna failure, the plurality of instructions is configured to cause the processor to:
- obtain an antenna failure index;
- compute, based on the one or more SRSs, an average SRS power on each non-failed antenna; and
- compute a relative noise power as a function of the average SRS power.

20. The non-transitory computer readable medium of claim 15, wherein to detect the antenna failure based on the one or more SRSs, the plurality of instructions is configured to cause the processor to perform detection of a timing advance by:
- transmitting a timing advance medium access control (MAC) control element (CE);
- in response to receiving a MAC CE acknowledgement, identifying a starting SRS with a new timing; and
- adjusting, based on the identified new timing, a tracked timing parameter for the timing advance.

* * * * *